United States Patent
Nakahara

(10) Patent No.: US 10,268,104 B2
(45) Date of Patent: Apr. 23, 2019

(54) LENS APPARATUS AND IMAGE PICKUP APPARATUS INCLUDING THE SAME

(71) Applicant: CANON KABUSHIKI KAISHA, Tokyo (JP)

(72) Inventor: Makoto Nakahara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/346,157

(22) Filed: Nov. 8, 2016

(65) Prior Publication Data

US 2017/0131620 A1   May 11, 2017

(30) Foreign Application Priority Data

Nov. 9, 2015 (JP) ................................ 2015-219105

(51) Int. Cl.
*G03B 15/03* (2006.01)
*G02B 6/00* (2006.01)
(Continued)

(52) U.S. Cl.
CPC .......... *G03B 15/03* (2013.01); *G02B 6/0051* (2013.01); *G02B 6/0068* (2013.01); *G02B 13/24* (2013.01);
(Continued)

(58) Field of Classification Search
None
See application file for complete search history.

(56) References Cited

U.S. PATENT DOCUMENTS 8,515,274 B2 * 8/2013 Daijo .................. G02B 6/0018
  362/16
9,219,864 B2   12/2015 Nakahara
(Continued)

FOREIGN PATENT DOCUMENTS

JP   2006-337422 A   12/2006
JP   2011-247978 A   12/2011
(Continued)

OTHER PUBLICATIONS

Japanese Office Action dated Oct. 2, 2018 in corresponding Japanese Patent Application No. 2015-219105 with English translation.

*Primary Examiner* — William B Perkey
(74) *Attorney, Agent, or Firm* — Carter, DeLuca & Farrell LLP

(57) ABSTRACT

A lens apparatus includes: an image pickup optical system; a holding frame that holds the image pickup optical system; and an illumination apparatus that is attached to an outer peripheral portion of an object side of the holding frame and applies light. The illumination apparatus includes light sources and a light guide member that causes internal reflection of light from the light sources so that the light propagates. The light guide member has an annular shape and has a light exit surface from which light is emitted toward an object side. A distance DL between two closest light sources in the light sources, an internal diameter D of the plurality of light guide member, and a distance WD from the light guide member to an object at a closest distance when the image pickup optical system is focused on the object at the closest distance are appropriately set respectively.

21 Claims, 5 Drawing Sheets

(51) Int. Cl.
*G03B 15/05* (2006.01)
*F21V 8/00* (2006.01)
*G02B 13/24* (2006.01)
*G03B 17/12* (2006.01)

(52) U.S. Cl.
CPC ............ *G03B 15/05* (2013.01); *G03B 17/12* (2013.01); *G03B 2215/05* (2013.01); *G03B 2215/0539* (2013.01); *G03B 2215/0575* (2013.01)

(56) References Cited

U.S. PATENT DOCUMENTS

| | | | |
|---|---|---|---|
| 9,377,606 B2 | 6/2016 | Nakahara | |
| 9,500,842 B2 | 11/2016 | Nakahara | |
| 9,869,923 B2 * | 1/2018 | Nakahara | G03B 15/06 |
| 9,921,456 B2 * | 3/2018 | Miyakawa | G03B 15/05 |
| 2006/0093344 A1 * | 5/2006 | Neel | G03B 15/05 396/176 |
| 2013/0051066 A1 * | 2/2013 | Nakamura | F21V 3/02 362/606 |
| 2016/0109784 A1 * | 4/2016 | Xu | H04N 5/2256 348/370 |
| 2017/0131620 A1 * | 5/2017 | Nakahara | G02B 6/0051 |
| 2017/0307962 A1 * | 10/2017 | Lin | G02B 6/0068 |

FOREIGN PATENT DOCUMENTS

| | | |
|---|---|---|
| JP | 2013-246422 A | 12/2013 |
| JP | 2014-142564 A | 8/2014 |

* cited by examiner

LENS APPARATUS AND IMAGE PICKUP APPARATUS INCLUDING THE SAME

BACKGROUND OF THE INVENTION

Field of the Invention

The present invention relates to a lens apparatus appropriate for, for example, a video camera, a digital still camera, and a TV camera, each having the function of performing close distance photography at approximately 1:1 magnification, and also relates to an image pickup apparatus including such a lens apparatus.

Description of the Related Art

A known image pickup optical system mainly for close distance photography is a macro lens. In general, close distance photography has a small distance from an object to an image pickup optical system, and thus, the image pickup optical system or a photographer can cast shadow over the object side in some cases. To prevent this, lighting is often needed in close distance photography. As a conventional illumination light source for image pickup, a flash light emission using a xenon lamp is used. Since the flash light emission using a xenon lamp is an instantaneous pulse light emission, however, there arises a problem that an illuminated object image cannot be seen through a finder or the like.

In such situations, light emitting diodes having a wide wavelength band in a visible range have been put into practical use in recent years. Japanese Patent Application Laid-Open No. 2006-337422 and Japanese Patent Application Laid-Open No. 2011-247978 describe illumination apparatuses in each of which a light emitting diode is disposed on a holding frame that holds a lens closest to an object side in an image pickup optical system to illuminate the object side.

Japanese Patent Application Laid-Open No. 2006-337422 describes an illumination apparatus in which a plurality of white light emitting diodes are arranged in an annular shape on an outer peripheral portion of the holding frame that holds the lens disposed closest to an object side. Japanese Patent Application Laid-Open No. 2011-247978 describes an illumination apparatus using a light guide part in which an optical path through which light propagates is formed in an annular shape. Japanese Patent Application Laid-Open No. 2011-247978 also describes that the amount of light applied from the illumination apparatus is changed by changing the location of a light source in an optical axis direction.

In the illumination apparatus described in Japanese Patent Application Laid-Open No. 2006-337422, each light source is disposed to have a light emission plane of the light source oriented in the optical axis direction of the image pickup apparatus. Thus, to uniformly illuminate an object, a large number of light sources are needed.

In the illumination apparatus described in Japanese Patent Application Laid-Open No. 2011-247978, a short distance between two light sources makes it difficult to uniformly illuminate an object.

SUMMARY OF THE INVENTION

The present invention has an object of providing a lens apparatus that can obtain uniform lighting in close distance photography without an increase in the number of light sources and also providing an image pickup apparatus including the lens apparatus.

A lens apparatus according to the present invention includes: an image pickup optical system; a holding frame that holds the image pickup optical system; and an illumination apparatus that is attached to an object side of the holding frame and applies light, wherein the illumination apparatus includes a plurality of light sources and a light guide member that causes internal reflection of light from the light sources so that the light propagates, the light guide member has an annular shape and has a light exit surface from which light is emitted toward an object side, and the lens apparatus satisfies conditional expressions:

$$0.2 < DL/D < 1.5$$

$$0.3 < D/WD < 6.0$$

where DL is a distance between two closest light sources in the plurality of light sources, D is an internal diameter of the light guide member, and WD is a distance from the light guide member to an object at a closest distance when the image pickup optical system is focused on the object at the closest distance.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

A lens apparatus according to the present invention includes an image pickup optical system, a holding frame that holds the image pickup optical system, and an illumination apparatus that is attached to an object side of the holding frame and illuminates light.

Figure 1:
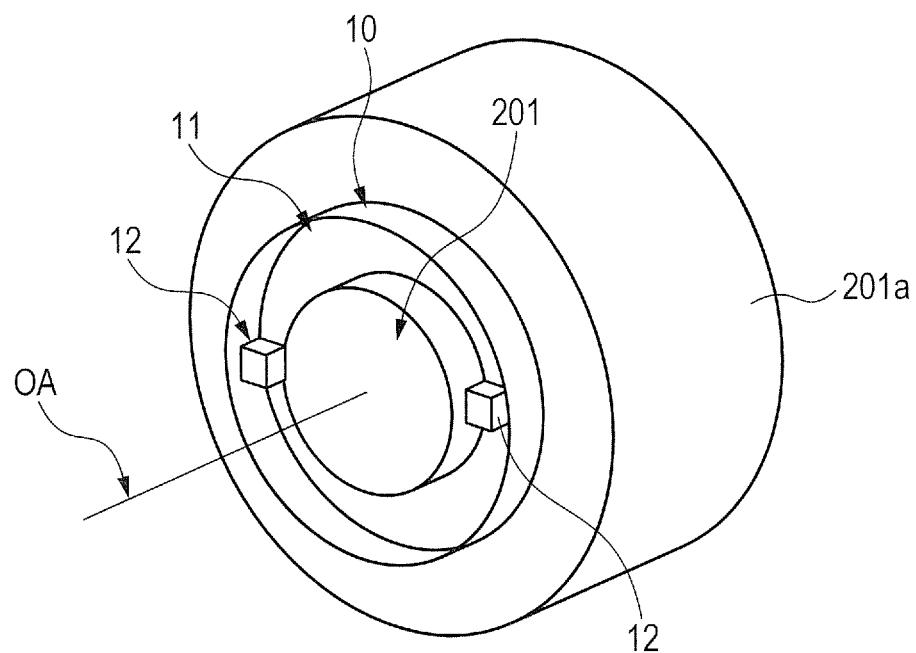
FIG. 1 is a perspective view illustrating a main portion of an appearance of a lens apparatus according to the present invention in which an illumination apparatus is attached to a holding frame that holds an image pickup optical system.

FIG. 1 is a perspective view illustrating a main portion of an appearance of a lens apparatus in which an illumination apparatus 10 according to the present invention is attached to an object side (light incident side) of an outer peripheral portion of a holding frame 201a that holds an image pickup optical system 201.

The illumination apparatus 10 includes a plurality of light sources 12 and a light guide member 11 that causes internal reflection of light from the light sources 12 so that the light propagates. The light guide member 11 has an annular optical path and a light exit surface 11b that emits light toward an object side. The plurality of light sources 12 are arranged on a portion of the annular shape of the light guide member 11 in such a manner that the normal of the light exit surface of each of the light sources coincides with a tangential direction 11c of the annular shape. The light sources 12 are constituted by, for example, white light emitting diodes. The illumination apparatus 10 is removably (detachably) attached to the holding frame 201a that holds the image pickup optical system 201.

Figure 2:
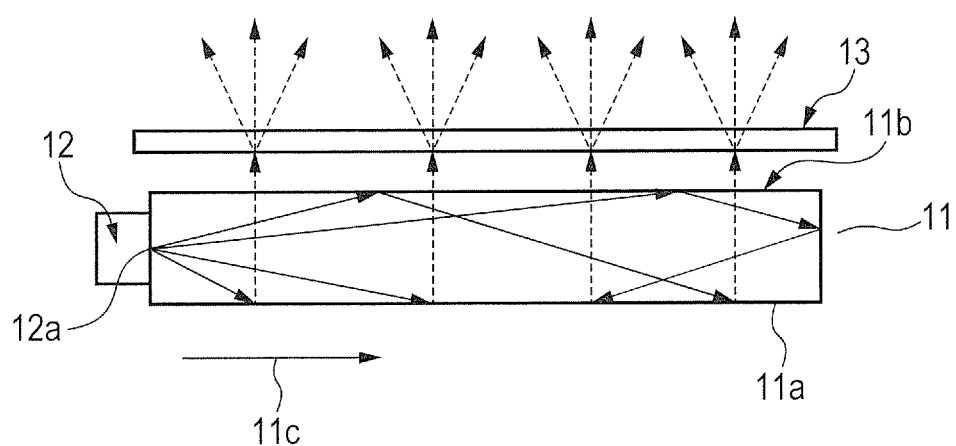
FIG. 2 is a front view schematically illustrating an optical path in a light guide member according to the present invention.

FIG. 2 is a cross-sectional view obtained by linearly developing a part of the annular portion of the light guide member 11 illustrated in FIG. 1. FIG. 2 schematically illustrates an optical path of light that propagates in the light guide member 11. The light guide member 11 illustrated in FIG. 2 has an annular shape and is made of a transparent resin. A back surface (a side surface opposite to a side facing an object, i.e., a lower surface in the front view) of the light guide member 11 is constituted by a reflective unit 11a of, for example, white paint or a mirror-finished sheet. Light from the light sources 12 is totally reflected on the inner surface of the light guide member 11 and reflected on the reflective unit 11a, and then is emitted toward an object side from a front surface (an upper surface in the front view, i.e., a light exit surface) 11b of the light guide member 11.

The reflective unit 11a is disposed on a side surface of the annular shape of the light guide member 11 opposite to a side surface of the light guide member 11 facing the object. Each of the light sources 12 is oriented in such a manner that the normal direction of a light exit surface 12a coincides with the tangential direction 11c of the annular shape of the light guide member 11. A ray emitted from the light source 12 enters a light incident surface of the light guide member 11, is totally reflected in the annular shape of the light guide member 11, is diffuse-reflected on the reflective unit 11a, and is emitted from the annular light exit surface 11b. A diffusion plate 13 that diffuses the ray from the light exit surface 11b and emits the diffused ray is provided. The diffusion plate 13 is provided as necessary, and may be omitted.

In a case where the normal direction of the light exit surface 12a of the light source 12 does not coincide with the tangential direction 11c of the annular shape of the light guide member 11, light emitted from the light source 12 is directly applied to an object surface. Thus, to obtain uniform illumination with a constant angle distribution at an object side, a large number of light sources are needed.

According to the present invention, the plurality of light sources 12 are arranged in such a manner that the normal direction of the light exit surface of each of the light sources 12 coincides with the tangential direction 11c of the light guide member 11. This arrangement enables a small number of light sources to apply a uniform ray with a constant angle distribution toward the object side as an illumination light in close distance photography so that an illumination with uniform light distribution can be obtained. In addition, the diffusion plate 13 for diffusing light from the light guide member 11 toward the object side is provided so that the illumination with uniform light distribution can be obtained.

Figure 3A:
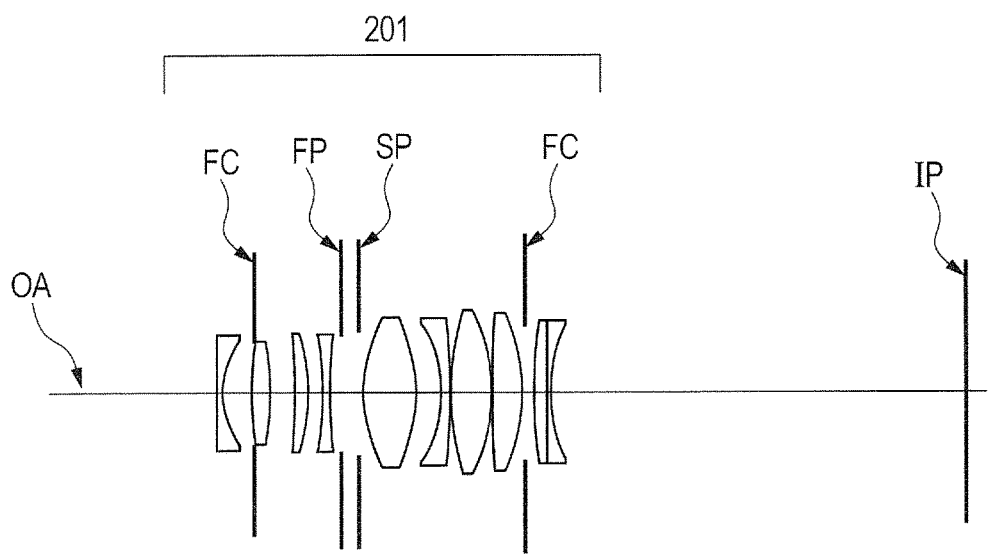
FIG. 3A is a cross-sectional view illustrating lenses of the image pickup optical system that enables close distance photography according to the present invention.
Figure 3B:
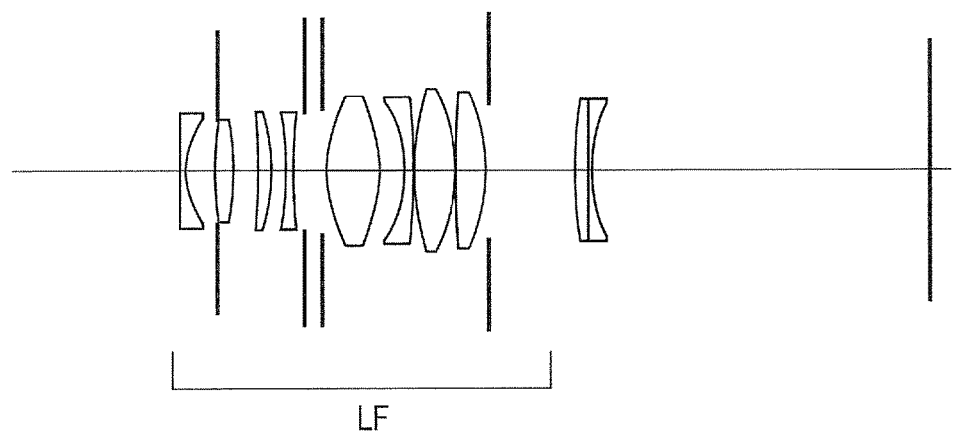
FIG. 3B is a cross-sectional view illustrating lenses of the image pickup optical system that enables close distance photography according to the present invention.
Figure 4:
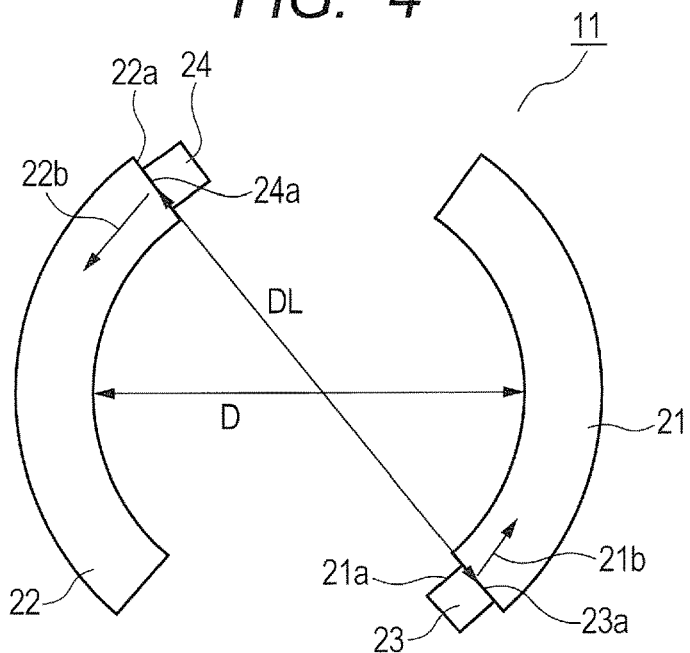
FIG. 4 is a plan view illustrating a main portion of an illumination apparatus according to a first embodiment of the present invention.

FIGS. 3A and 3B are lens cross-sectional views illustrating the image pickup optical system 201 which has a macro-photography function and to which the lens apparatus according to the present invention can be attached. In the lens cross-sectional views, FIG. 3A corresponds to a focused state on an object at infinity and FIG. 3B corresponds to a focused state on an object at closest distance. In the lens cross-sectional views, the left is an object side (front side), and the right is an image side (rear side).

Reference numeral 201 denotes an image pickup optical system, reference character SP denotes an aperture stop, reference character FP denotes a sub stop, reference character FC denotes a flare cutter, and reference character OA denotes an optical axis. Reference character IP denotes an image plane. When used as an image pickup optical system of a digital camera, a video camera, or a monitoring camera, the image plane IP corresponds to an image pickup plane of an image pickup element (photoelectric converter) such as a CCD sensor or a CMOS sensor. When used as an image pickup optical system of a silver-halide film camera, the image plane IP corresponds to a film plane.

Characteristics of the lens apparatus according to the present invention will now be described. The illumination apparatus 10 according to the present invention includes the light guide member 11 made of a transparent resin and including an annular optical path in which light propagates through repetitive internal reflections. The illumination apparatus 10 also includes the plurality of light sources 12 each having a light exit surface whose normal direction corresponds to the tangential direction 11c of the annular shape of the light guide member 11 and configured to emit light into the light guide member 11 from an end of the light guide member 11.

The light guide member 11 includes the light exit surface 11b that causes internal reflection of light from the light sources 12 and emits light from a part of the annular shape of the light guide member 11 toward the object side. Suppose a distance of two closest light sources in the plurality of light sources 12 (distance between centers of light emission planes of the light sources) is DL, and an internal diameter of the light guide member 11 is D. In addition, suppose a distance from the light guide member 11 to an object at a closest distance when the image pickup optical system 201 is focused on the object at the closest distance is WD. Then, the following conditional expressions are satisfied.

$$0.2 < DL/D < 1.5 \quad (1)$$

$$0.3 < D/WD < 6.0 \quad (2)$$

The object at the closest distance here refers to an object at a distance of 20 mm from the light guide member 11 when numerical data of the image pickup optical system 201 described later is expressed in units of mm.

Technical meanings of Conditional Expressions (1) and (2) described above will now be described. Conditional Expression (1) defines a ratio of the distance between the light sources 12 (between centers of light emission planes of the light sources 12) to the internal diameter of the light guide member 11. Here, the light guide member 11 may have any annular shape. For example, the outer shape of the light guide member 11 may be an annular ring shape, an oval shape, or a part of such shapes. In a case where the light guide member 11 has an annular ring shape, the internal diameter of the light guide member 11 is the diameter of an inner circle. In a case where the light guide member 11 has an oval shape or a part of an oval shape, the internal diameter of the light guide member 11 is an average of the diameter of an inscribed circle and a circumscribed circle of the light guide member 11.

If the ratio is above the upper limit of Conditional Expression (1), the internal diameter of the light guide member 11 is excessively small so that it becomes difficult to attach the lens system to an inner side of the light guide member 11. On the other hand, if the ratio is below the lower limit of Conditional Expression (1), the distance between the light sources is small so that it is difficult to obtain an illumination with uniform light distribution in an object plane parallel to an image pickup plane in close distance photography at approximately 1:1 magnification. In this case, disadvantageously, a large number of light sources are needed to obtain the illumination with uniform light distribution.

Conditional Expression (2) defines a ratio of the internal diameter of the light guide member 11 to a distance on an optical axis from the light guide member 11 to an object plane in a focused state of the image pickup optical system on an object at the closest distance. Conditional Expression (2) is used for reducing the size of the illumination apparatus. If the internal diameter of the light guide member 11 increases above the upper limit of Conditional Expression (2), the size of the illumination apparatus 10 increases disadvantageously. On the other hand, if the internal diameter of the light guide member 11 decreases below the lower limit of Conditional Expression (2), it is difficult to attach the lens system to the inner side of the light guide member 11.

By satisfying Conditional Expressions (1) and (2) as described above, a uniform ray with constant angle distribution can be applied as an illumination light in close distance photography using a smaller number of light sources so that an illumination with uniform light distribution can be easily obtained. The numerical ranges of Conditional Expressions (1) and (2) are preferably as follows:

$$0.3 < DL/D < 1.4 \quad (1a)$$

$$0.35 < D/WD < 5.50 \quad (2a).$$

More preferably, the numerical ranges of Conditional Expressions (1a) and (2a) are as follows:

$$0.4 < DL/D < 1.3 \quad (1b)$$

$$0.4 < D/WD < 5.0 \quad (2b).$$

The image pickup apparatus according to the present invention includes: the lens apparatus including the illumination apparatus 10 disposed on an outer peripheral portion at a light incident side of the holding frame 201a that holds the image pickup optical system 201; and a camera body including an image pickup element that receives light of an image formed by the lens apparatus. In the lens apparatus according to the present invention, at least one of the conditional expressions below is preferably satisfied.

Suppose a back focal length when the image pickup optical system 201 is focused on an object at infinity is BF, and a focal distance of the image pickup optical system 201 is f. Suppose the image pickup optical system 201 has an aperture stop SP, a lens total length of the image pickup optical system 201 is TD, and a distance from the aperture stop SP to an image plane is DSP. Suppose an imaging magnification of the image pickup optical system 201 when the image pickup optical system 201 is focused on an object at the closest distance is β. Then, at least one of the following conditional expressions is preferably satisfied:

$$0.20 < BF/f < 1.80 \quad (3)$$

$$0.65 < DSP/TD < 0.95 \quad (4)$$

$$0.5 \leq |\beta| \quad (5).$$

Here, the back focal length is a distance from a last lens surface (most image-side lens surface) to the image plane. The lens total length is a distance obtained by adding the value of the back focal length BF to a distance from a first lens surface (most object-side lens surface) to the last lens surface.

Technical meanings of the conditional expressions described above will now be respectively described. Conditional Expression (3) relates to a ratio of the back focal length to the focal distance of the total system in a focused state on an object at infinity, and optimizes the back focal length in the image pickup optical system. If the back focal length excessively increases above the upper limit of Conditional Expression (3), the lens total length increases so that it is difficult to reduce the size of the image pickup optical system. If the back focal length excessively decreases below the lower limit of Conditional Expression (3), an incident angle of an off-axial ray on an image plane excessively increases so that a ray that should reach a screen peripheral portion is less likely to reach a light-receiving element (image pickup element), and a large amount of shading occurs disadvantageously.

Conditional Expression (4) relates to a ratio of the distance on an optical axis from the aperture stop SP to the image plane to the lens total length of the total system, and optimizes a position of the aperture stop SP in the image pickup optical system. Here, the lens total length is a distance from the first lens surface to the image plane when the image pickup optical system is focused on an object at infinity. When the image pickup optical system is switched to a wide angle of view, a front-lens effective diameter increases. Reduction of the front-lens effective diameter and increase of the angle of view are intended by satisfying Conditional Expression (4), while avoiding a so-called offset stop state in which the center of a ray of a peripheral angle of view does not pass through a vicinity of the center of the aperture stop SP.

If the ratio exceeds the upper limit of Conditional Expression (4), the position of an entrance pupil approaches so that the radial size of a focus lens unit increases unfavorably. If the ratio decreases below the lower limit of Conditional Expression (4), the incident height of the off-axial ray when the off-axial ray enters a lens unit near an object side at the closest distance while the apparatus is focused on the object increases so that an effective diameter of the lens unit near the object side increases.

Conditional Expression (5) defines an image magnification when the image pickup optical system is focused on an object at the closest distance. If the ratio decreases below the lower limit of Conditional Expression (5), advantages of the image pickup optical system for macro photography are not sufficiently obtained disadvantageously. The numerical ranges of Conditional Expressions (3) to (5) are preferably as follows:

$$0.25 < BF/f < 1.70 \quad (3a)$$

$$0.70 < DSP/TD < 0.93 \quad (4a)$$

$$0.7 \leq |\beta| \quad (5a).$$

More preferably, the numerical ranges of Conditional Expressions (3a) to (5a) are as follows:

$$0.30 < BF/f < 1.60 \quad (3b)$$

$$0.75 < DSP/TD < 0.90 \quad (4b)$$

$$1.0 \leq |\beta| \quad (5b).$$

Although the preferred embodiment of the present invention has been described above, the present invention is not limited to this embodiment, and various modifications and changes may be made within the gist of the present invention.

FIG. 4, FIG. 5, and FIGS. 6A and 6B are plan views illustrating arrangements of light guide members and light sources in first, second, and third embodiments of the illumination apparatus of the lens apparatus according to the present invention. In the first embodiment illustrated in FIG. 4, DL is a distance between a light source 23 and a light source 24. In addition, D is an internal diameter of the light guide member 11. In the first embodiment illustrated in FIG. 4, the light guide member 11 includes two annular pieces 21 and 22 obtained by partially cutting off an annular shape. The light source 23 is disposed at an end 21a of the annular piece 21 in such a manner that the normal of a light exit surface 23a coincides with a tangential direction 21b of the annular piece 21. Similarly, the light source 24 is disposed at an end 22a of the annular piece 22 in such a manner that the normal of a light exit surface 24a coincides with a tangential direction 22b of the annular piece 22.

Figure 5:
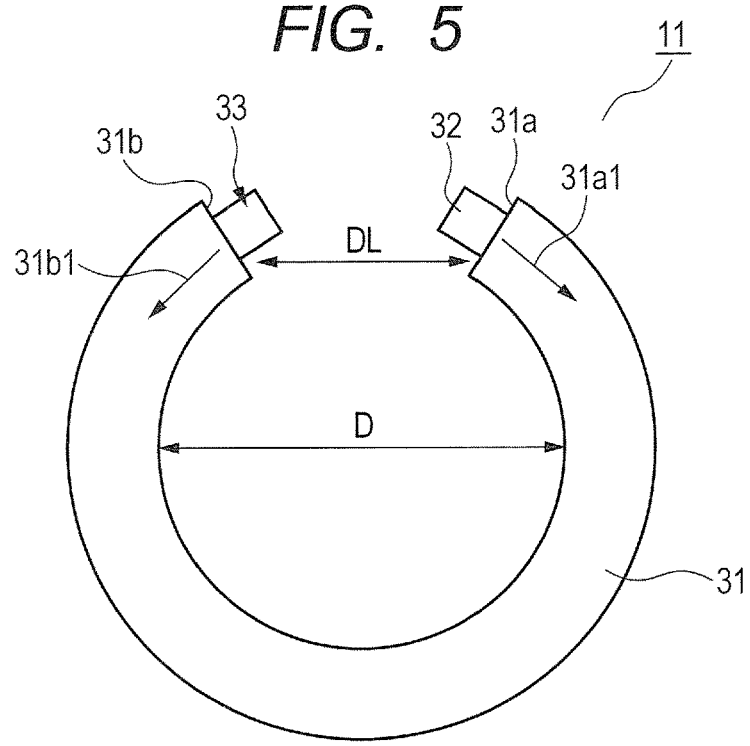
FIG. 5 is a plan view illustrating a main portion of an illumination apparatus according to a second embodiment of the present invention.

In the second embodiment illustrated in FIG. 5, DL is a distance between a light source 32 and a light source 33. In addition, D is an internal diameter of the light guide member 11. In the second embodiment illustrated in FIG. 5, the light guide member 11 is constituted by one annular piece 31 in a shape obtained by partially cutting off an annular shape. The light sources 32 and 33 are disposed at both ends 31a and 31b of the annular piece 31 in such a manner that the normal direction of the light exit surface coincides with a tangential direction 31a1 (31b1) of the annular piece 31.

Figure 6A:
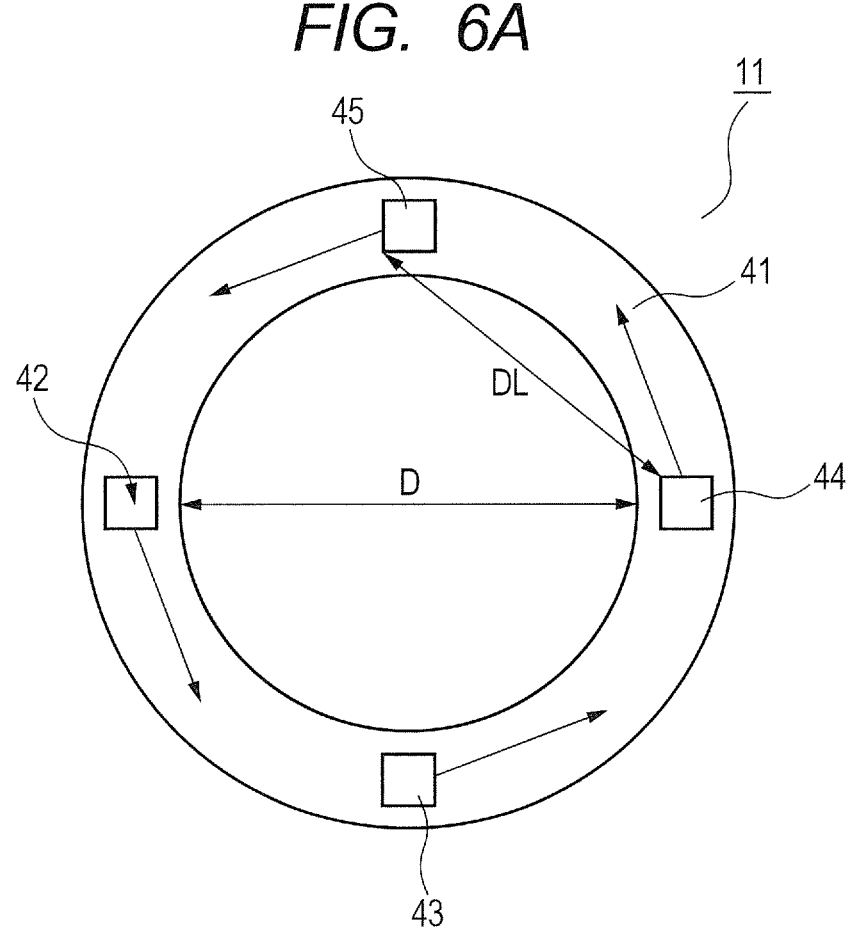
FIG. 6A is a plan view illustrating a main portion of an illumination apparatus according to a third embodiment of the present invention.
Figure 6B:
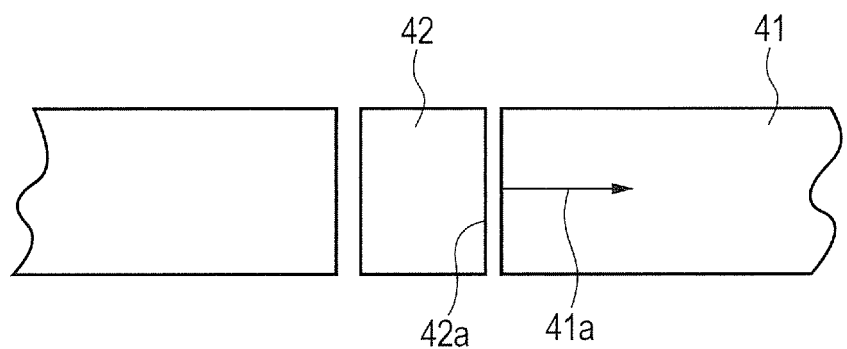
FIG. 6B is a plan view illustrating a main portion of an illumination apparatus according to the third embodiment of the present invention.

In the third embodiment illustrated in FIG. 6A, DL is a distance between a light source 44 and a light source 45. In addition, D is an internal diameter of the light guide member 11. In the third embodiment, as illustrated in FIG. 6B, which is a partial cross-sectional view of FIG. 6A, a light source 42 is disposed in a recessed region obtained by partially cutting off an annular shape of a light guide member 41. In this embodiment, the light source 42 is disposed inside the recessed region of the light guide member 41 in such a manner that the normal direction of a light exit surface 42a coincides with a tangential direction 41a of the annular shape of the light guide member 41. The other light sources 43, 44, and 45 are disposed in manners similar to the light source 42.

In the third embodiment illustrated in FIGS. 6A and 6B, four light sources 42 to 45 are arranged at substantially regular intervals on a peripheral portion of the annular light guide member 41. Any number of light sources may be provided as long as the light sources are arranged at regular intervals.

An embodiment of a digital still camera (image pickup apparatus) using the lens apparatus according to the present invention will now be described with reference to FIG. 7.

Figure 7:
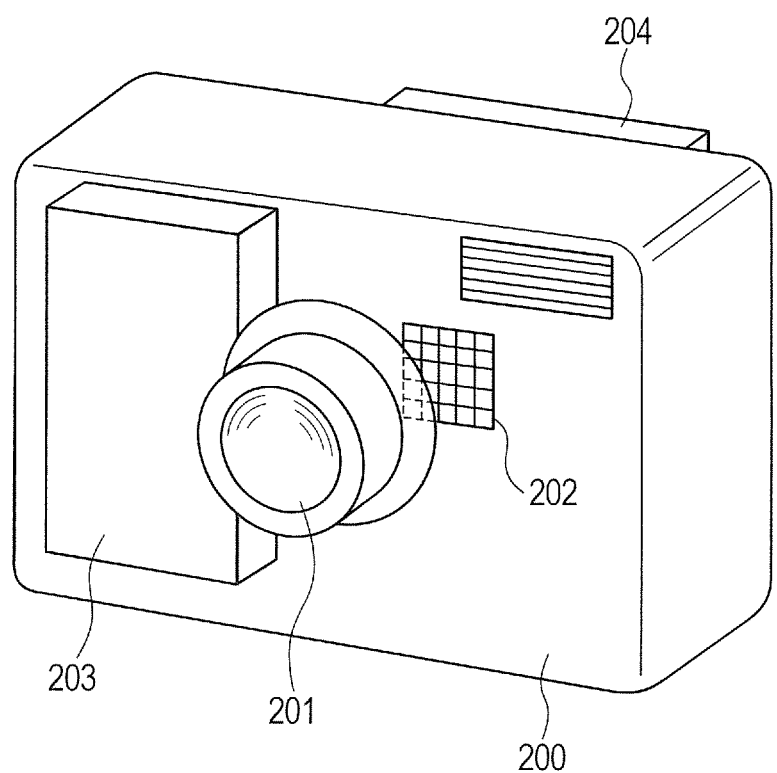
FIG. 7 is an outline view illustrating a main portion of an image pickup apparatus according to the present invention.

In FIG. 7, reference numeral 200 denotes a camera body, and reference numeral 201 denotes an image pickup optical system attached to a lens apparatus. Reference numeral 202 denotes an image pickup element (photoelectric converter), such as a CCD sensor or a CMOS sensor, incorporated in the camera body and configured to receive light of an object image formed by the image pickup optical system 201, and reference numeral 203 denotes a memory that records information corresponding to an object image subjected to photoelectric conversion by the image pickup element 202. Reference numeral 204 is a finder constituted by, for example, a liquid crystal display panel and used for observing an object image formed on the image pickup element 202.

Numerical data of the image pickup optical system of the lens apparatus according to the present invention will now be described. In the numerical data, i is the order of a plane from an object side, ri is an i-th radius of curvature (an i-th plane), and di is an interval between the i-th plane and an (i+1)th plane. In addition, ndi and νdi are a refractive index and an Abbe number, respectively, of the fourth material with respect to a d line, and * means that the target plane is an aspheric surface. The aspheric surface data indicates an aspheric surface coefficient in a case where the aspheric surface is expressed by the following equation:

$$x = (h^2/R)/[1+\{1-(1+k)(h/R)^2\}^{1/2} + B \cdot h^4 + C \cdot h^6 + D \cdot h^8 + E \cdot h^{10}$$

where x is a displacement from a reference plane in an optical axis direction, h is a height perpendicular to the optical axis, R is a radius of a quadric serving as a base, k is a conic constant, and B, C, D, and E are aspheric surface coefficients of fourth, sixth, eighth, and tenth orders, respectively. The "e-Z" means "$10^{-Z}$." Table 1 shows a relation between the conditional expressions described above and values in the embodiments.

(Numerical Data)

| Unit: mm | | | | |
|---|---|---|---|---|
| Surface data | | | | |
| Surface number i | ri | di | ndi | νdi |
| 1 | −197.665 | 0.50 | 1.58313 | 59.5 |
| 2* | 8.009 | 3.33 | | |
| 3 (FC) | ∞ | −0.30 | | |
| 4 | 34.792 | 1.84 | 1.80518 | 25.4 |
| 5 | −34.792 | 2.55 | | |
| 6 | −39.399 | 1.22 | 1.77250 | 49.6 |
| 7 | −24.094 | 1.67 | | |
| 8 | −23.519 | 0.60 | 1.95375 | 32.3 |
| 9 | 82.440 | 0.95 | | |
| 10 (FP) | ∞ | 1.90 | | |
| 11 (stop) (SP) | ∞ | 0.61 | | |
| 12 | 16.940 | 5.23 | 1.51823 | 58.9 |
| 13 | −16.940 | 2.75 | | |
| 14 | −12.932 | 0.65 | 1.90366 | 31.3 |
| 15 | −143.739 | 0.15 | | |
| 16 | 26.215 | 4.23 | 1.49700 | 81.5 |
| 17 | −18.292 | 0.15 | | |
| 18* | 64.432 | 2.97 | 1.58313 | 59.5 |
| 19* | −17.234 | 0.29 | | |
| 20 (FC) | ∞ | (variable) | | |
| 21 | 51.516 | 1.22 | 1.95906 | 17.5 |
| 22 | 332.148 | 0.45 | 1.83481 | 42.7 |
| 23 | 16.990 | 42.22 | | |
| image plane | ∞ | | | |

| Aspheric surface data |
|---|
| second plane |

K = 0.00000e+000   B = −1.76791e−004   C = −2.65273e−006
D = 7.81442e−009   E = −6.68614e−010

18th plane

K = 0.00000e+000   B = −7.23379e−005   C = −1.23764e−008
D = −2.58452e−009   E = 1.02225e−010

-continued

Unit: mm

19th plane

K = 0.00000e+000   B = 6.10927e−005   C = 1.30720e−007
D = −2.33941e−009  E = 1.12506e−010

Data items

| | | |
|---|---|---|
| focal length | | 27.74 |
| F-number | | 3.61 |
| half angle of view (degrees) | | 26.21 |
| image height | | 13.66 |
| infinity | (image pickup magnification) × 1.00 | |
| d20 | 0.94 | 8.75 |

TABLE 1

| | Embodiment 1 | Embodiment 2 | Embodiment 3 |
|---|---|---|---|
| Values | | | |
| DL | 25.8 | 4.8 | 60.0 |
| D | 24.0 | 10.0 | 88.0 |
| WD | 20.0 | 20.0 | 20.0 |
| DSP | 61.9 | 61.9 | 61.9 |
| TD | 76.1 | 76.1 | 76.1 |
| BF | 42.2 | 42.2 | 42.2 |
| f | 27.7 | 27.7 | 27.7 |
| β | −1.00 | −1.00 | −1.00 |
| Conditional expression | | | |
| (1) | 1.075 | 0.48 | 0.682 |
| (2) | 1.2 | 0.5 | 4.4 |
| (3) | 1.52 | 1.52 | 1.52 |
| (4) | 0.813 | 0.813 | 0.813 |
| (5) | 1.00 | 1.00 | 1.00 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-219105, filed Nov. 9, 2015, which is hereby incorporated by reference herein in its entirety.

What is claimed is:

1. A lens apparatus, comprising:
an image pickup optical system;
a holding frame that holds the image pickup optical system; and
an illumination apparatus arranged at an object side of the holding frame, including a plurality of light sources and a light guide member, and configured to emit light toward an object side from a light exit surface of the light guide member,
wherein the light guide member has a generally annular shape and causes an internal reflection so that the light propagates from the plurality of light sources toward the light exit surface, and
wherein the lens apparatus satisfies conditional expressions:

$0.2 < DL/D < 1.5$, and $0.3 < D/WD < 6.0$ where DL is a distance between two closest light sources in the plurality of light sources, D is an internal diameter of the light guide member, and WD is a distance from the light guide member to an object at a closest distance when the image pickup optical system is focused on the object at the closest distance.

2. The lens apparatus according to claim 1, wherein the light guide member includes a reflective member disposed at a side surface opposite to the light exit surface and configured to reflect light incident on the light guide member.

3. The lens apparatus according to claim 1, further comprising a diffusion plate configured to diffuse light emitted from the light exit surface and disposed at an object side of the light exit surface of the light guide member.

4. The lens apparatus according to claim 1, wherein the lens apparatus satisfies a conditional expression:

$0.20 < BF/f < 1.80$, where BF is a back focal length of the image pickup optical system when the image pickup optical system is focused on an object at infinity, and f is a focal distance of the image pickup optical system.

5. The lens apparatus according to claim 1, wherein
the image pickup optical system includes an aperture stop, and
wherein the lens apparatus satisfies a conditional expression:

$0.65 < DSP/TD < 0.95$, where TD is a lens total length of the image pickup optical system, and DSP is a distance from the aperture stop to an image plane.

6. The lens apparatus according to claim 1, wherein the lens apparatus satisfies a conditional expression:

$0.5 \le |\beta|$, where β is an imaging magnification of the image pickup optical system when the image pickup optical system is focused on an object at a closest distance.

7. The lens apparatus according to claim 1, wherein each of the plurality of light sources is disposed in such a manner that a normal direction of the light exit surface of the light guide member coincides with a tangential direction of the annular shape of the light guide member.

8. The lens apparatus according to claim 1, wherein the illumination apparatus is detachable from the holding frame.

9. An image pickup apparatus, comprising:
the lens apparatus according to claim 1; and
an image pickup element configured to receive an image formed by the lens apparatus.

10. The lens apparatus according to claim 1, wherein the light guide member has an annular shape or an annular shape with a part partially cut off.

11. A lens apparatus comprising:
an image pickup optical system;
a holding frame that holds the image pickup optical system; and
an illumination apparatus arranged at the holding frame, including a plurality of light sources and a light guide member, and configured to emit light toward an object side from a light exit surface of the light guide member,
wherein the light guide member, including a first annular piece and a second annular piece, has a generally annular shape and causes an internal reflection so that the light propagates from the plurality of light sources toward the light exit surface, wherein the plurality of light sources includes a first light source and a second light source which is the closest light source to the first light source in the plurality of light sources, the first light source being arranged at an end portion of the first annular piece, the second light source being arranged at an end portion of the second annular piece, wherein light emitted from the first light source and light emitted from the second light source propagate in a same rotation direction on a circumferential direction of the light guide member, and wherein the lens apparatus satisfies conditional expression:

$$0.2<DL/D<1.5,$$

where DL is a distance between the first light source and the second light source, and D is an internal diameter of the light guide member.

12. The lens apparatus according to claim 11, further comprising a diffusion plate configured to diffuse light emitted from the light exit surface and disposed at an object side of the light exit surface of the light guide member.

13. An image pickup apparatus comprising:
the lens apparatus according to claim 11; and
an image pickup element configured to receive an image formed by the lens apparatus.

14. A lens apparatus comprising:
an image pickup optical system;
a holding frame that holds the image pickup optical system; and
an illumination apparatus attached to arranged at the holding frame, including a plurality of light sources and a light guide member, and configured to emit light toward an object side from a light exit surface of the light guide member,
wherein the light guide member has an annular shape and causes an internal reflection so that the light propagates from the plurality of light sources toward the light exit surface, and
wherein the lens apparatus satisfies conditional expressions:

$$0.2<DL/D<1.5, \text{ and}$$

$$0.20<BF/f<1.80,$$

where DL is a distance between two closest light sources in the plurality of light sources, D is an internal diameter of the light guide member, BF is a back focal length of the image pickup optical system when the image pickup optical system is focused on an object at infinity, and f is a focal distance of the image pickup optical system.

15. The lens apparatus according to claim 14, wherein the lens apparatus satisfies a conditional expression:

$$0.5 \leq |\beta|,$$

where $\beta$ is an imaging magnification of the image pickup optical system when the image pickup optical system is focused on an object at a closest distance.

16. The lens apparatus according to claim 14, wherein the light guide member includes a plurality of annular pieces and each of the plurality of light sources is disposed at an end portion of a respective one of the plurality of the annular pieces.

17. The lens apparatus according to claim 14, wherein the light guide member has an annular shape or an annular shape with a part partially cut off.

18. The lens apparatus according to claim 14, further comprising a diffusion plate configured to diffuse light emitted from the light exit surface and disposed at an object side of the light exit surface of the light guide member.

19. An image pickup apparatus comprising:
the lens apparatus according to claim 14; and
an image pickup element configured to receive an image formed by the lens apparatus.

20. A lens apparatus comprising:
an image pickup optical system includes an aperture stop;
a holding frame that holds the image pickup optical system; and
an illumination apparatus arranged to the holding frame, including a plurality of light sources and a light guide member, and configured to emit light toward an object side from a light exit surface of the light guide member,
wherein the light guide member has an annular shape and causes an internal reflection so that the light propagates from the plurality of light sources toward the light exit surface, and
wherein the lens apparatus satisfies conditional expressions:

$$0.2<DL/D<1.5, \text{ and}$$

$$0.65<DSP/TD<0.95,$$

where DL is a distance between two closest light sources in the plurality of light sources, D is an internal diameter of the light guide member, TD is a lens total length of the image pickup optical system, and DSP is a distance from the aperture stop to an image plane.

21. An image pickup apparatus comprising:
the lens apparatus according to claim 20; and
an image pickup element configured to receive an image formed by the lens apparatus.

* * * * *